United States Patent
Singhal et al.

(10) Patent No.: US 11,693,910 B2
(45) Date of Patent: Jul. 4, 2023

(54) PERSONALIZED SEARCH RESULT RANKINGS

(71) Applicant: Microsoft Technology Licensing, LLC, Redmond, WA (US)

(72) Inventors: Aman Singhal, Bellevue, WA (US); Marcelo De Barros, Redmond, WA (US); Prithvishankar Srinivasan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 640 days.

(21) Appl. No.: 16/219,791

(22) Filed: Dec. 13, 2018

(65) Prior Publication Data

US 2020/0192951 A1  Jun. 18, 2020

(51) Int. Cl.
| | |
|---|---|
| *G06F 16/95* | (2019.01) |
| *G06F 16/90* | (2019.01) |
| *G06N 20/00* | (2019.01) |
| *G06N 5/04* | (2023.01) |
| *G06F 16/9535* | (2019.01) |
| *G06F 16/9538* | (2019.01) |
| *G06F 16/901* | (2019.01) |
| *G06F 16/908* | (2019.01) |

(52) U.S. Cl.
CPC ........ *G06F 16/9535* (2019.01); *G06F 16/908* (2019.01); *G06F 16/9024* (2019.01); *G06F 16/9538* (2019.01); *G06N 5/04* (2013.01); *G06N 20/00* (2019.01)

(58) Field of Classification Search
None
See application file for complete search history.

(56) References Cited

U.S. PATENT DOCUMENTS

| | | |
|---|---|---|
| 8,190,621 B2 | 5/2012 | Ryu |
| 8,762,326 B1 | 6/2014 | Zhou et al. |
| 8,898,155 B2 | 11/2014 | Tang |
| 9,514,221 B2 | 12/2016 | Tropin et al. |

(Continued)

OTHER PUBLICATIONS

Matthijs, et al., "Personalizing Web Search Using Long Term Browsing History", In Proceedings of the Fourth ACM International Conference on Web search and data mining., Jan. 1, 2011, 10 Pages.

(Continued)

*Primary Examiner* — Amy Ng
*Assistant Examiner* — Raheem Hoffler
(74) *Attorney, Agent, or Firm* — Rainier Patents, P.S.

(57) ABSTRACT

The present concepts relate to an improved personalized search engine that can generate personalized rankings of search results in view of individual user's personal preferences and interests. Information about a segment of online content is collected. Certain activities by a user are tracked, including search queries submitted by the user, search results clicked on by the user, and/or web pages browsed by the user. From these activities, the user's preferences relating the segment are inferred using the collected segment information. When the user conducts a search directed to the segment, certain search results that the user is more likely to be interested in, based on the user's preferences, are ranked higher to generate the personalized rankings.

20 Claims, 8 Drawing Sheets

(56) References Cited

U.S. PATENT DOCUMENTS

| | | | |
|---|---|---|---|
| 11,003,669 B1* | 5/2021 | Nelson | G06F 16/9535 |
| 11,023,819 B2* | 6/2021 | Sinha | G06N 20/00 |
| 2003/0115191 A1* | 6/2003 | Copperman | G06F 16/9038 |
| 2006/0064411 A1* | 3/2006 | Gross | G06F 16/9535 |
| 2010/0268596 A1 | 10/2010 | Wissner et al. | |
| 2011/0295824 A1 | 12/2011 | Schneider | |
| 2012/0078708 A1* | 3/2012 | Taylor | G06Q 30/0242 |
| | | | 709/224 |
| 2012/0239667 A1 | 9/2012 | Vysyaraju et al. | |
| 2013/0173610 A1 | 7/2013 | Hu et al. | |
| 2015/0293897 A1* | 10/2015 | Myslinski | G06F 3/0488 |
| | | | 707/755 |
| 2016/0188673 A1* | 6/2016 | Maughan | G06F 16/9535 |
| | | | 707/733 |
| 2016/0255139 A1* | 9/2016 | Rathod | G06F 16/9535 |
| | | | 709/203 |
| 2017/0169334 A1* | 6/2017 | Sweeney | G06F 16/248 |
| 2017/0185899 A1* | 6/2017 | Chawla | G06N 5/04 |
| 2018/0329990 A1* | 11/2018 | Severn | G06F 16/93 |
| 2019/0179861 A1* | 6/2019 | Goldenstein | G06F 16/248 |
| 2019/0341027 A1* | 11/2019 | Vescovi | G10L 15/22 |

OTHER PUBLICATIONS

Mobasher, Bamshad, "Chapter 3, Data Mining for Web Personalization", In the Book of The Adaptive Web, Methods and Strategies of Web Personalization, Oct. 10, 2008, pp. 90-135.

"International Search Report and Written Opinion Issued in PCT Application No. PCT/US19/064804", dated Feb. 27, 2020, 13 Pages.

"First Examination Report Issued in Indian Patent Application No. 202147025751", dated Jan. 13, 2023, 7 Pages.

\* cited by examiner

PERSONALIZED SEARCH RESULT RANKINGS

BRIEF DESCRIPTION OF THE DRAWINGS

The accompanying drawings illustrate implementations of the present concepts. Features of the illustrated implementations can be more readily understood by reference to the following description in conjunction with the accompanying drawings. Like reference numbers in the various drawings are used where feasible to indicate like elements. In some cases, parentheticals are utilized after a reference number to distinguish like elements. Use of the reference number without the associated parenthetical is generic to the element. The accompanying drawings are not necessarily drawn to scale. In the figures, the left-most digit of a reference number identifies the figure in which the reference number first appears. The use of similar reference numbers in different instances in the description and the figures may indicate similar or identical items.

DETAILED DESCRIPTION

Overview

Figure 1:
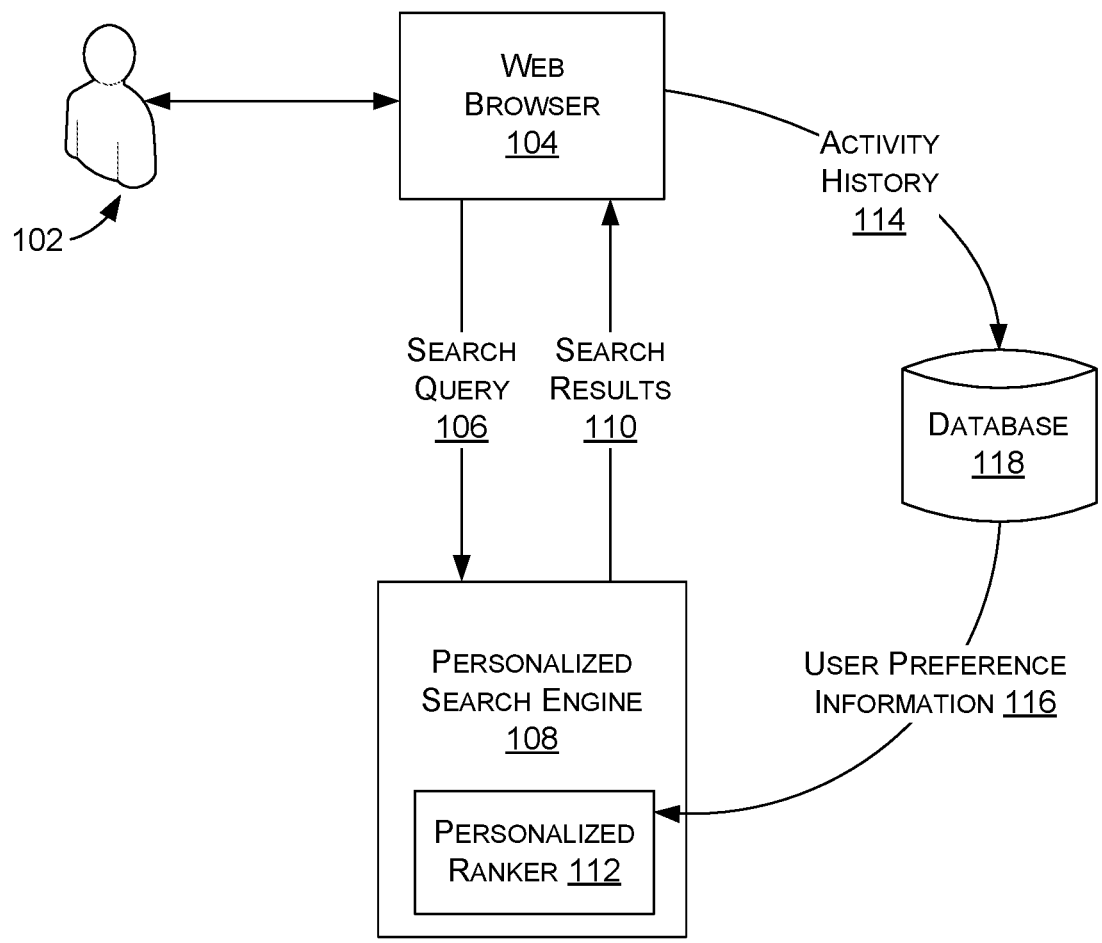
FIG. 1 shows a flowchart illustrating overview principles of the present concepts.

The present concepts relate to a platform for personalizing the rankings of search results to provide an improved searching experience. A personalized search engine uses individual user preferences that may be inferred from the user's past history of searching and browsing activities. The inferred preferences can be used to rank search results so that certain search results that the user is more likely to be interested in are ranked higher than other search results. The improved personalized search engine provides a user with enriched searching experience by presenting first the search results that the individual user is more likely to be interested in.

Conventional search engines (and conventional rankers) do not necessarily consider individual user preferences or interests when ranking search results. Therefore, conventional search engines may return the search results in the same order for all users. Conventional search engines may rank search results based on popularity, number of clicks, number of links, etc., but they may not personalize the rankings based on individual preferences. For example, if two users with vastly different movie preferences—one user preferring English-language action films whereas the other user preferring foreign-language romance films—search for "movies" using conventional search engines, both users may receive a list of movies as search results in the same order based on the search results' global popularity. Similarly, if two users with different preferences for theater chains—one user preferring AMC Theatres™ whereas the other user preferring Regal™ theaters—search for "showtimes" using conventional search engines, the search results returned to both users could receive the same rankings without regard to the users' personal preferences for theater chains. As yet another example, if two users who are shopping for shirts search for "shirts," conventional search engines tend to return the same rankings of search results to both users irrespective of the users' individual preferences for certain brands, merchants, sizes, colors, gender, styles, fabric, etc.

One of the main problems with conventional search engines is that the user experience suffers considerably as relevant search results are not presented first but rather appear after many irrelevant search results or are buried among irrelevant search results. The generalized rankings of search results returned by conventional search engines make it difficult for users to find the relevant search results. For example, the user may have to read past many irrelevant search results before finding the relevant search result. The user may have to scroll far past irrelevant search results or even page through many pages of irrelevant search results before discovering the relevant search result. Some users may lose patience and give up the search effort altogether even before finding one relevant search result.

To address these technological deficiencies of conventional search engines, the present concepts provide a technological solution that produces personalized rankings of search results that prioritize certain search results that are more in line with the user's individual preferences (e.g., customized search results). For example, if a user who prefers Sketchers™ brand of shoes searches for "shoes," then personalized rankings of search results returned to the user may rank certain search results relating to the Sketchers™ brand higher than other brands, such as Nikes™ or Adidas™, even though the generic rankings that would have been returned by a conventional search engine would have ranked certain search results relating to Nikes™ or Adidas™ higher than Sketchers™ based on, for example, global popularity among all users.

Personalized rankings of search results returned by the personalized search engine, according to the present concepts, have several benefits and advantages. Users are more likely to have a superior searching experience by easily finding relevant search results that relate to their individual preferences and interests. Users will more quickly find relevant search results among numerous search results that are often returned when searching. Search providers save resources because users need not try multiple search queries, which can overload system resources, to find relevant search results. Search providers generate higher advertising revenues due to more relevant search results being presented to users first. The personalized search engine further enriches users' searching experience by automatically using their preferences without substantial effort from the users.

In some implementations, the present concepts of personalizing the rankings of search results may be implemented globally for all searches. Alternatively, in other implementations, personalization of search result rankings may be implemented and performed only for certain searches that are directed to specific segments of online content.

Examples of segments include, for example, movie showtimes, retail shopping, sports, flights, etc. The scope of a segment can vary widely, but generally each segment can relate to a specific topic. For example, a movie showtimes segment may narrowly include showtimes only for cinematic films, whereas a broader showtimes segment may include showtimes for local events, comedy shows, circus shows, music concerts, etc. A basketball segment may be directed to only one sport, whereas a sports segment may encompass all major league sports, for instance.

FIG. 1 shows a high-level flowchart 100 illustrating some overview principles of the present concepts. A user 102 may interact with an application, such as a web browser 104. The web browser 104 may reside on any type of device, such as a laptop, a smart phone, kiosk, automobile, etc. The user 102 may interact with the web browser 104 by providing inputs (e.g., via keyboard, a pointer, or a touchscreen) and receiving outputs (e.g., via a display). The user 102 may control the web browser 104 to access a web site of a search provider, for example, by inputting a uniform resource locator ("URL") associated with the search provider. In response, the web browser 104 may present a search web page of the search provider that can be used by the user 102 to perform searches.

Once at the search web page, the user 102 may conduct a search by inputting a search query 106 in the form of a text string to the web browser 104. The web browser 104 may, in turn, pass the search query 106 to a personalized search engine 108 of the search provider. In response, the personalized search engine 108 may return a set of search results 110 that correspond to the search query 106 to the web browser 104. The search results 110 may be web pages and may be represented as corresponding URLs that can be used to access the web pages. Therefore, the personalized search engine 108 may return a search results web page containing those URLs as the search results 110. Next, the web browser 104 can present the search results 110 to the user 102 by rendering and displaying the search results web page.

The search results 110 may be ranked in the order determined by a personalized ranker 112, and the web browser 104 may display the search results 110 to the user 102 in that order. The personalized ranker 112 may be a component of the personalized search engine 108 (as illustrated in FIG. 1) or may be separate from the personalized search engine 108. In some implementations, the personalized ranker 112 may be specific to a particular segment. That is, each segment may have its own segment-specific personalized ranker.

Consistent with some implementations of the present concepts, activity history 114 of the user 102 may be obtained from the web browser 104 and the user's preferences inferred from the activity history 114 may be stored as user preference information 116 in a database 118. The activity history 114 of the user 102 may include, for example, (1) query history, (2) click history, and (3) browse history. The query history may refer to a history of past search queries submitted by the user 102. The click history may refer to a history of past search results that the user 102 clicked on. And the browse history may refer to a history of web pages that the user 102 browsed to in the past. In some implementations, the personalized search engine 108 may provide the query history and the click history, but the personalized search engine 108 may not have direct access to the browse history. From the activity history 114 of the user 102, the user preference information 116 may be ascertained. Consistent with some implementations of the present concepts, each segment may have segment-specific user preference information 116. Furthermore, the personalized search engine 108 and/or the personalized ranker 112 (as mentioned above) may also be specific to a particular segment.

According to the present concepts, the personalized ranker 112 of the personalized search engine 108 can consider the user preference information 116 to rank the search results 110. The personalized ranker 112 can, for example, rank higher certain search results that the user 102 would be more interested in, based on the user preference information 116 that is personal to the user 102. Thus, the rankings of the search results 110 can be personalized to the user's preferences, such that the top items in the personalized rankings of the search results 110 would be would be more relevant to the user 102 than the top items in generic, non-personalized rankings of the search result 110.

To illustrate the advantages of the improved personalized search engine 108 over conventional search engines with an example, if the user 102 has in the past submitted multiple search queries for United Airlines™, clicked on multiple search results relating to United Airlines™ and browsed to multiple web pages relating to United Airlines™, the user preference information 116 can reflect that the user 102 prefers United Airlines™. When the user 102 searches for "flights" or "airlines," the user preference information 116 of the user 102 may be passed to the personalized ranker 112 such that the rankings of the search results 110 returned to the user 102 are personalized in a way that prioritizes certain search results relating to United Airlines over other search results relating to other airlines. If a different user, whose user preference information indicates that she prefers American Airlines™, searches for "flights" or "airlines," then the search results returned to her would rank certain search results relating to American Airlines™ higher.

Thus, the personalized search engine 108 can provide personalized rankings that are individually tailored to the user's own personal preferences. As another example, if the user 102 has a history of almost always booking window seats, the user preference information 116 may reflect that the user 102 prefers window seats. Accordingly, if the user 102 searches for "flights," then certain search results that have available window seats may be ranked higher than other flights with no available window seats. On the other hand, if another user who prefers aisle seats searches for "flights," then this user would be presented with the search results in a different order that prioritizes certain flights with available aisle seats. Thus, according to the present concepts, even though two users submit the same search query 106, the rankings of the returned search results 110 can be personalized to the individual user by promoting certain search results that are more relevant to the individual user based on the user's personal preferences.

As mentioned briefly above, additional advantages of the personalized search engine 108, consistent with the present concepts, include providing easier and simpler searching experience for the user 102 who does not necessarily need to explicitly enumerate all of her preferences in the search query 106. Conventional search engines require the user 102 to input long-winded search queries that attempt to recite her relevant preferences, such as "tom cruise action movies in english with higher than 4 out of 5 star review playing in mid-afternoon in regal theaters with leather reclining seats," "red cotton sleeveless women shirts medium size sold at nordstrom under $50," or "united airlines nonstop flights from seattle to los angeles with available window seats in business class having higher than 95% on-time departures." The improved personalized search engine 108, according to the present concepts, can relieve the user 102 from the tremendous burden of remembering, verbalizing, and typing explicit personal preferences every time the user 102 submits a search query 106. Using the personalized search engine 108, the user 102 may simply search for "movies," "shirts," or "flights," and be presented with search results 110 that automatically account for her preferences based on her past activity history 114. These benefits are provided by the present concepts, which automatically ascertain the user's personal preferences, whether the user 102 herself knows them or not, in view of the activity history 114 and intelligently modify the rankings of the search results 110 to present certain search results that are more relevant to the user 102 first.

The present concepts will be described in more detail below with respect to additional figures. In some implementations, the present concepts may be described as being implemented in two stages. The first stage may involve offline pre-processing (or pre-search processing) that can be performed before the user 102 performs a search (i.e., before the user 102 submits the search query 106). The second stage may involve online or runtime processing (or search-time processing) that can be performed in real time during the search (i.e., after the user 102 submits the search query 106 and until the corresponding search results 110 are returned to the user 102). Although several acts consistent with the present concepts are described below as being performed in these two stages, those acts may be performed in different stages or in different order.

Pre-Search Processing

In accordance with some implementations of the present concepts, segment information may be collected. That is, information regarding various entities that relate to a certain segment may be gathered and stored for future access. For example, in connection with a showtimes segment, information about various entities (such as, movies, theaters, actors, writers, directors, producers, etc.) may be collected and stored. As another example, in connection with a sports segment, information about entities such as players, teams, coaches, venues, leagues, etc., may be collected. Accordingly, separate segment information may be stored in association with each segment for which the present concepts have been implemented. The segment information may be non-user-specific data. In other words, the segment information may be common to all users. In one implementation, each entity may be assigned a unique entity identification (ID), such as a Satori ID.

For each entity, many types of detailed information may be collected. For example, a movie entity in a showtimes segment may include detailed information, such as title, language, genre, rating, release date, actors, directors, producers, film locations, budget, revenues, runtime, aspect ratio, color, soundtracks, etc. As another example, a team entity in a sports segment may include detailed information about players, coaches, leagues, home city, home venue, founding year, championships, revenues, owners, general managers, statistics, records, etc.

In one implementation consistent with the present concepts, segment information may be stored in a graph form. For instance, each entity may be represented by its own graph. The nodes of the entity graph may represent detailed information and categories of information (or data types) relating to the entity. The nodes of the entity graph may be connected by edges. The detailed information relating to an entity may be organized in a hierarchy using the graph structure formed by nodes and edges. Therefore, the segment information for a particular segment that has many entities may include many graphs for those respective entities. In another implementation consistent with the present concepts, segment information, including the detailed information about all the entities, may be stored in one connected graph that links together entity nodes. Alternatively, segment information may be stored in a table form rather than in a graph form. Segment information may be stored in a database. Segment information may be stored in the same database 118 where the user preference information 116 is stored or in a different database.

Figure 2:
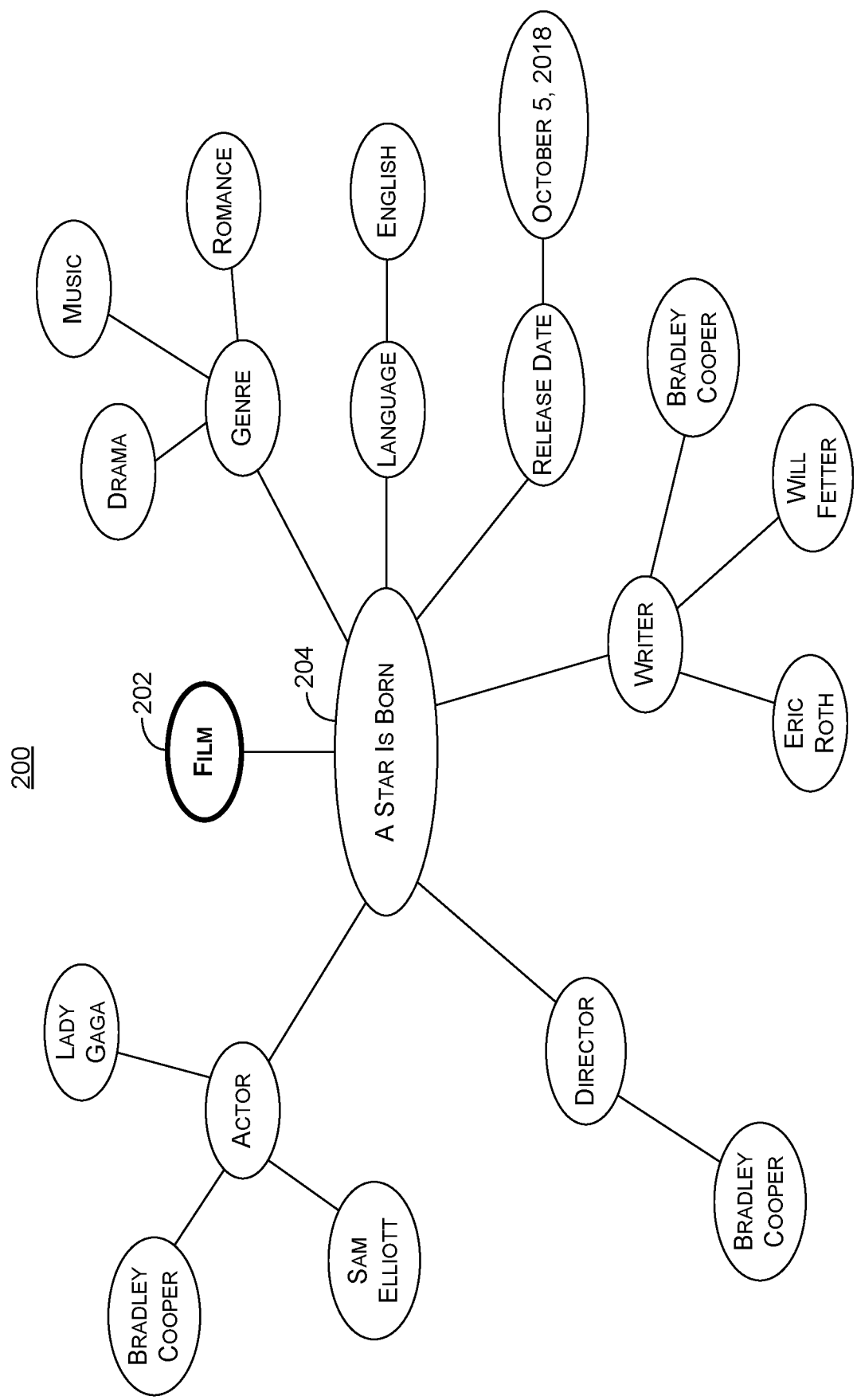
FIG. 2 shows a graphical representation of an entity in a segment, consistent with some implementations of the present concepts.

FIG. 2 shows a graph 200 representing an example of a movie entity in a showtimes segment. In this example, the movie entity illustrated is the film entitled "A Star Is Born," the entity is stored in a graph form, and the entity is represented by its own entity graph 200. The entity graph 200 may include a root node 202. In this example, the root node 202 may indicate a film data type. Branching off the root node 202 is a child node 204 representing the title of the movie as "A Star Is Born." Branching off the title node 204 are several children nodes indicating various data types, including actor, director, writer, release date, language, and genre. Each of these children nodes may include one or more leaf nodes that include details about the movie entity.

Consistent with the present concepts, one or more nodes in the graph may have an associated entity ID. For example, an entity ID representing the film "A Star Is Born" may be assigned to the root node 202 or the title node 204. Additionally, one or more of the actor nodes may be assigned entity IDs associated with the corresponding actors. Optionally, a node representing an actor may be linked to another graph for that actor entity.

FIG. 2 is a simplified example of a small entity provided for illustrative purposes. A graph associated with an entity, according to the present concepts, may be far more detailed and may contain many more nodes in a vastly larger graph. Moreover, a segment may contain very large number of entities, for example, multiple millions of entities. Furthermore, the information in the entity graph 200 depicted in FIG. 2 and the organizational structure are merely examples; many other data structures and organizational structures are possible.

In one implementation, segment information may be obtained from a segment data provider. For example, STATS LLC provides sports-related data. The data from the provider may be broader in scope compared to the target segment, and thus the relevant information related to the particular segment may be culled from the provided data. The data may be further filtered. For instance, only the top one million entities included in the data (e.g., based on the number of clicks and/or impressions) may be filtered and included in the segment information. Additionally, certain data from the provider that would not be used to rank search results may be filtered and excluded from the segment information.

Alternatively, in another implementation, segment information may be built by crawling the Internet or databases. For example, segment information for a movie segment may be built by crawling the IMDb (Internet Movie Database) web site as well as other movie-related web sites. In some implementations, both the data from providers and data from crawlers may be used together to augment or supplement each other or to validate and confirm each other.

According to the present concepts, the segment information may be updated. For example, segment information for a movie showtimes segment may be updated to reflect new movies, new theaters, upcoming showtimes, etc. Similarly, segment information for a sports segment may be updated to reflect recent games, new players, new teams, changes in coach and manager positions, new statistics, etc. Segment information may be updated by obtaining more recent data from segment data providers or by crawling relevant web sites or databases. Segment information may be updated periodically (for example, daily, weekly, monthly, quarterly, yearly, etc.) or continually as new data becomes available from providers and/or crawlers.

Consistent with the present concepts, the user preference information 116 of the user 102 may be determined and stored for future access. In some implementations, the user 102 may be identified in order to track her activities and determine her preferences. For example, the user 102 may be identified via login credentials used to access a computer device (e.g., Windows™ login, Apple™ login, Linux™ login, etc.), login credentials provided to the web browser 104 (e.g., Chrome™ login, Firefox™ login, etc.), or login credentials provide to a search provider's web site (e.g., Bing™ login, Google™ login, Yahoo™ login, etc.). Furthermore, the user 102 may be identified via IP address, MAC address, SIM card ID, location tracking, etc. Each user may be assigned a unique user ID, such as a client ID or an anonymous identification ("ANID"). Therefore, the process of identifying the user 102 may involve identifying the user ID. The user ID of the user 102 may be stored in the user preference information 116 to associate the user preference information 116 with the user 102.

Figure 3:
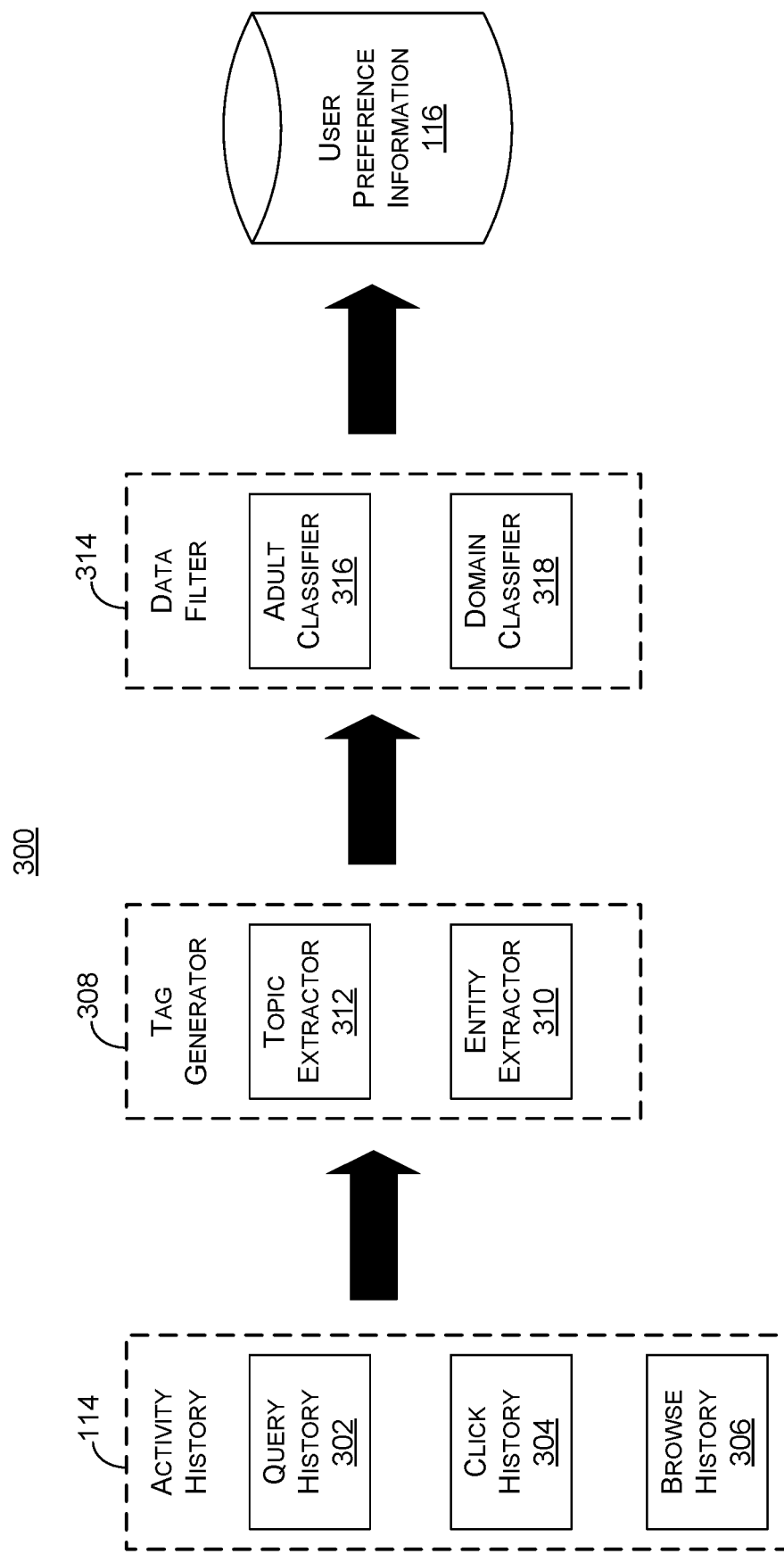
FIG. 3 shows a block diagram flowchart illustrating the generation of user preference information, consistent with some implementations of the present concepts.

FIG. 3 shows a block diagram flowchart 300 illustrating the generation of the user preference information 116. As discussed above with respect to FIG. 1, the user preference information 116 of the user 102 can be inferred from the activity history 114 of the user 102. The activity history 114 may include any types of historical information reflecting activities by the user 102 from which her preferences may be inferred. In some implementations of the present concepts, the activity history 114 may include one or more types of activities, such as: (1) a query history 302, (2) a click history 304, and/or (3) a browse history 306. These three example types of activity history may be provided by the web browser 104. The personalized search engine 108 may also be able to track the query history 302 and the click history 304. The activity history 114 may not be limited to activities performed on the web browser but may include any activity from which user preferences may be inferred. For example, activity history 114 may include activities (queries, clicks, and browses) on social media apps, locations visited using a GPS-enabled vehicle, and purchase histories from credit card transaction records, all of which may indicate, for example, topics, brands, merchants, shows, theaters, sports teams, restaurants, etc., preferred by the user 102.

The present concepts automatically and intelligently infer the preferences and interests of the user 102 without necessarily requiring the user 102 to explicitly state or input her preferences. The present concepts can avoid the burden and hassle of surveying the user 102 for her preferences using a questionnaire form. The user 102 is able to enjoy the benefits of being presented with personalized rankings of search results without necessarily having to manually input her preferences.

The query history 302 may include a history of past search queries submitted by the user 102. The query history 302 may indicate topics or entities that the user 102 prefers or is interested in, since the user 102 presumably submitted search queries about those preferences. The query history 302 may be captured and provided by the web browser 104 or received and tracked by the search provider (or its personalized search engine 108).

The click history 304 may include a history of past search results, produced in response to search queries, that the user 102 clicked on. The click history 304 may indicate topics or entities that the user 102 prefers or is interested in, since the user 102 presumably clicked on search results relating to those preferences. The click history 304 may be captured and provided by the web browser 104 or received and tracked by the search provider (or its personalized search engine 108).

In some implementations, a distinction may be made between satisfactory clicks and dissatisfactory clicks. For instance, if the user 102 clicks on a particular search result with hopes that the particular search result is relevant, but upon browsing the corresponding web page, realizes that the web page is irrelevant, the user 102 may close the web page and/or return to the search results to try clicking on another search result. On the other hand, if the user 102 clicks on a particular search result and the corresponding web page is relevant, the user 102 may dwell on that relevant web page for some time before closing it or browsing away from it. In one implementation, satisfactory clicks and dissatisfactory clicks may be distinguished using dwell times associated with the clicks. The threshold dwell time for determining satisfactory clicks may be fixed or varied. In some implementations consistent with the present concepts, the click history 304 may include a history of only satisfactory clicks while ignoring or discarding the history of dissatisfactory clicks. Alternatively, the click history 304 may include a history of both satisfactory clicks and dissatisfactory clicks without distinction. In another implementation, the click history 304 may include the history of dissatisfactory clicks as providing a lower-confidence indication of the user's preferences compared to the history of satisfactory clicks. The confidence levels may be determined based at least on the dwell times associated with the clicks.

The browse history 306 may include a history of past web sites and/or web pages browsed by the user 102 using the web browser 104. The browse history 306 may indicate topics or entities that the user 102 prefers or is interested in, since the user 102 presumably browsed through web pages relating to those preferences. The browse history 306 may be captured and provided by the web browser 104. In some implementations, similar to the click history 304, the browse history 306 may also distinguish between satisfactory browses and dissatisfactory browses based on, for example, the dwell time spent by the user 102 on the web pages.

In some implementations consistent with the present concepts, the user 102 may opt out of having her activity history 114 tracked, either temporarily or altogether. For example, the user 102 may choose not to identify herself by not logging in to the web browser 104 and/or to the search provider's web site. By remaining anonymous, the user 102 may search, click, and browse without having her activities tracked and saved to affect future search result rankings. In such scenarios, the user 102 may simply choose to log back in to identify herself and take advantage of the present concepts.

Furthermore, the web browser 104 and/or the search provider may provide an option (or a setting) to disable or suspend the feature of recording the history of submitted search queries, clicked search results, and/or browsed web pages. For instance, privacy mode or incognito mode is a feature common in many web browsers that provides similar effects of not recording user activities. Moreover, the web browser 104 and/or the search provider may provide an option to clear (i.e., delete) any prior query history 302, click history 304, and/or browse history 306 that has been tracked and recorded for the user 102. As such, the user 102 may choose what types of activity history 114 (i.e., the query history 302, the click history 304, and/or the browse history 306) and at what time periods such historical information should be recorded.

For example, if the user 102 is a student who needs to perform many searches relating to the Holocaust for a school report, but she does not want to be inundated after the school report with search results relating to Holocaust movies when she searches for "movies," the user 102 can temporarily suspend the tracking of her activity history 114 during her research for the school report. Moreover, the user 102 may disable, suspend, or erase the activity history 114 for privacy reasons. If there is no activity history 114 for the user 102 (or an insufficient amount of activity history 114 to confidently infer the user preference information 116 for the user 102), it may not be possible to provide personalized rankings of search results according to the present concepts.

Consistent with the present concepts, a tag generator 308 may determine one or more tags based on the activity history 114 of the user 102. The tags may be associated with, for example, an entity or a topic that the user 102 is interested in. These tags may be stored in the user preference information 116 to indicate that the user 102 prefers the entities or topics associated with the stored tags.

For instance, the tag generator 308 may include an entity extractor 310 that determines if any token (i.e., a word or a phrase) in a search query is an entity in the target segment by searching the segment information. For example, if the query history 302 indicates that the user 102 has a history of submitting search queries such as "game schedule for dallas cowboys," "cheap dallas cowboys shirts," and "best dallas cowboys player of all time," then the entity extractor 310 can reference the segment information for the sports segment and discover that Dallas Cowboys™ is a team entity In turn, the tag generator 308 can create a Dallas Cowboys tag to be stored in the user preference information 116 of the user 102. The Dallas Cowboys tag stored in the user preference information 116 may indicate that the user 102 has a preference for (i.e., has an interest in) the Dallas Cowboys™. The tag generator 308 may include and/or use a tokenizer, a parser, a parts-of-speech tagger, natural language processing algorithms, etc., to analyze search queries and identify entities.

The tag generator 308 may label the Dallas Cowboys tag in the user preference information 116 with the entity ID associated with the Dallas Cowboys entity in the segment information, such that the same entity ID would exist in both the user preference information 116 and the segment information.

As another example, the tag generator 308 may include a topic extractor 312 that determines one or more topics relevant to a web page that the user 102 either clicked on, according to the click history 304, or browsed to, according to the browse history 306. The tag generator 308 may extract the content (e.g., text snippets) of the web page. In one implementation, the tag generator 308 may use a parts-of-speech tagger to find subject phrases in the text snippets. The topic extractor 312 may parse the hyper-text markup language ("HTML") of the web page. The topic extractor 312 may use one or more algorithms, such as natural language processing ("NLP") algorithms and/or term frequency-inverse document frequency ("TF-IDF") algorithms that analyze factors such as the frequency of words, etc., to identify one or more topics from the web page and to calculate confidence scores associated with the topics. For example, in some implementations, the topic extractor 312 may use a parts-of-speech tagger to assign a confidence score for each key word or phrase extracted from a sentence or a paragraph in the web page. Then, the topic extractor 312 may generate a dependency graph of the key words and phrases, and use the dependency graph to further extract additional key words and phrases from the web page.

A confidence score associated with a topic may be a measurement of how related the web page is to the topic. The confidence score may be normalized to a range from zero to one—one being the most related. For example, if a web page is primarily about shoes and discusses the Nike™ brand quite a lot along with other shoe brands to a lesser degree, the topic of shoes may be given a confidence score of 0.9, and the topic of Nike™ may be given a confidence score of 0.7. For instance, in one implementation, a confidence score may be calculated for a phrase in the text snippet by measuring the authority of the phrase (or keyword) with respect to the rest of the text. For example, the topic extractor 312 may store a list of top web sites related to a particular topic. If the web page being analyzed is included in the list, then the topic extractor 312 may look at the inverse (or reverse) mapping of the top tags mapped to that web site. The authority of the phrase with respect to the rest of the text may be determined using an inverse ranking model involving tag extraction.

For example, a web page that reviews the movie Jack Reacher starring Tom Cruise may be analyzed to extract two topics "Jack Reacher" and "Tom Cruise," each having a confidence score indicating how likely the web page is about such a topic. Then, the tag generator 308 (or the components therein) may match the topics extracted from the web page with the segment information to generate tags that can be stored in the user preference information 116. For example, the tag generator 308 may search in the segment information associated with the movie segment for the topics "Jack Reacher" and "Tom Cruise" to find matching entities and may generate tags based on the information associated with those matching entities.

In some implementations, the content of the web page may be compared with the entities in the segment information (i.e., perform a join operation) to determine what topics extracted from the web page are entities (such as movie names, actor names, etc.) in the target segment. For example, if a web page mentions "Jack Reacher" many times, the tag generator 308 can search the showtimes segment information for "Jack Reacher" and determine that it is a movie in response to finding a movie entity having that name. If the same search were performed in the sports segment information and "Jack Reacher" is not found, then it may be determined that the topic of Jack Reacher (and perhaps the web page) is unrelated to sports.

In certain implementations, the search results returned by the personalized search engine 108 may include entity IDs in association with certain search results, where those entity IDs match the ones stored with entities in the segment information. If the user 102 clicks on a particular search result (e.g., a satisfactory click), then the tag generator 308 may use the entity ID associated with the clicked search result, look up the entity ID in the segment information to find the matching entity, and use the information about the matching entity stored in the segment information to generate one or more tags to be stored in the user preference information 116. On the other hand, if the clicked search result does not have an associated entity ID, the tag generator 308 may analyze the content of the web page to generate one or more tags, as discussed above. Also, a combination of the two approaches may be implemented.

Consistent with some implementations of the present concepts, the tag generator 308 may calculate a confidence value associated with a tag. A confidence value may be normalized to a range from zero to one—one indicating the highest degree of preference or interest by the user 102. Other ranges and methodologies for the confidence value are possible. In an example implementation, if the user 102 searches for "a star is born," then the tag generator 308 may calculate a confidence value of 1 for the A Star Is Born tag. Additionally, the tag generator 308 may reference the A Star Is Born movie entity in the movie segment information and generate additional tags and associated confidence values. For instance, the tag generator 308 may create a romance genre tag with a confidence value of 0.6, an English language tag with a confidence value of 0.7, a Lady Gaga tag with a confidence value of 0.8, and so forth (see FIG. 2). These examples of tags would indicate that the user 102 has certain degrees of preference for romance genre movies, English-language movies, and Lady Gaga, respectively. The confidence values may be calculated using rule-based algorithms and/or machine-learning models.

As another example, if the activity history 114 of the user 102 indicates that the user 102 has a history of submitting search queries for movie titles (such as, "star wars," "avatar," "matrix", and "star trek") and has a history of browsing web pages relating to these movies, and the associated movie entities in the movie segment information classify these movie entities as being a science fiction genre, then the tag generator 308 may create a science fiction genre tag to be stored in the user preference information 116 for the user 102. The science fiction tag would indicate that the user 102 has an interest in science fiction movies, which was inferred from the query history 302 and browse history 306 involving several science fiction movies.

In the above example, the multiple occurrences of searching and browsing activities related to the science fiction genre may generate multiple instances of the science fiction genre tag in the user preference information 116. Therefore, such a cluster of tags (in view of the number of tags as well as the confidence values associated with them) may indicate the user's strong preference for the science fiction genre. In an alternative implementation, the tag generator 308 may progressively promote the user's preference for the science fiction genre by increasing the confidence value associated with one science fiction genre tag in the user preference information 116 as the user 102 submits additional search queries and browses to higher numbers of web pages relating to the science fiction genre, for example, based on a weighted sum of the confidence values associated with the multiple search queries and multiple web pages. That is, the more times the user 102 performs activities (queries, clicks, and browsing) relating to science fiction movies, science fiction actors, science fiction retail shopping, etc. (for example, watching a lot of science fiction movie trailers), the higher confidence value may be stored for the science fiction genre tag in the user preference information 116, indicating that the user 102 has a strong preference for the science fiction genre.

As another example, if the user 102 has clicked on 20 search results relating to movies in the past 6 months, as indicated by the activity history 114, then the tag generator 308 may determine based on the movie segment information that 12 out of those 20 movies are in Hindi language and 7 out of the 20 movies are in French language. Accordingly, the tag generator 308 may store a Hindi language tag with a confidence value of 0.8 and a French language tag with a confidence value of 0.6 in the user preference information 116.

Consistent with some implementations of the present concepts, the user preference information 116 may store dislikes (i.e., the opposite of preferences and interests). For example, the user 102 may submit search queries using the exclusion operator "NOT" (which may be indicated by a minus sign or a hyphen to some search providers). The excluded search query terms may be used to infer the user's dislikes. Additionally, the user 102 may also exhibit dislikes based on short dwell times associated with dissatisfactory clicks and/or dissatisfactory web pages. The user's dislikes may be inferred based on web pages that were browsed only for a short period of time. The activity history 114 may record such activities that indicate the user's dislikes, and the tag generator 308 may generate dislike tags (or negative preference tags). For instance, confidence values associated with tags may range from −1 to 1, where negative confidence values indicate dislikes and −1 represents the strongest dislike. Furthermore, even where the user preference information 116 contains a tag with a positive confidence value, subsequent user activity indicating dislike for that tag may cause the tag generator to demote the user's preference for the tag (i.e., decrease the confidence value associate with the tag into the negative range).

In accordance with some implementations of the present concepts, a data filter 314 may identify and exclude certain subjects from the user preference information 116. For example, certain controversial subjects (such as adult, political, and medical subjects) may be filtered and excluded from the user preference information 116. The user 102 may not want her preferences relating to adult content, political issues, and/or medical concerns being tracked and stored for privacy reasons. Moreover, the user 102 may not want the rankings of the search results 110 presented to her to be biased for certain subjects, including politics. Such subjects may be excluded from the user preference information 116 and even excluded from the activity history 114. In one implementation, such subjects may be excluded globally for all users by excluding the subjects from the segment information.

The data filter 314 may include one or more classifiers. For instance, the data filter 314 may include an adult classifier 316. The adult classifier 316 may classify one or more of the entities identified by the entity extractor 310, the topics identified by the topic extractor 312, and the tags generated by the tag generator 308 as relating to an adult subject. A similar classifier may be implemented in the data filter 314 for classifying a political subject, a medical subject, or any other subject the data filter 314 may be configured to filter.

In some implementations, the data filter 314 may include a domain classifier 318. The domain classifier 318 may include a list or database of domains relating to certain subjects. For example, the domain classifier 318 may include a list of adult content domains, political domains, and/or medical domains. The domain classifier 318 may use these lists to classify web pages from the click history 304 and/or browse history 306 as relating to subjects that should be filtered by the data filter 314.

The data filter 314 may preclude tags from being stored in the user preference information 116 if the tags relate to subjects filtered by the classifiers. In one implementation, the user 102 may be given the option (via settings configuration) to choose one or more subjects (e.g., adult, political, medical, etc.) to filter.

Figure 4:
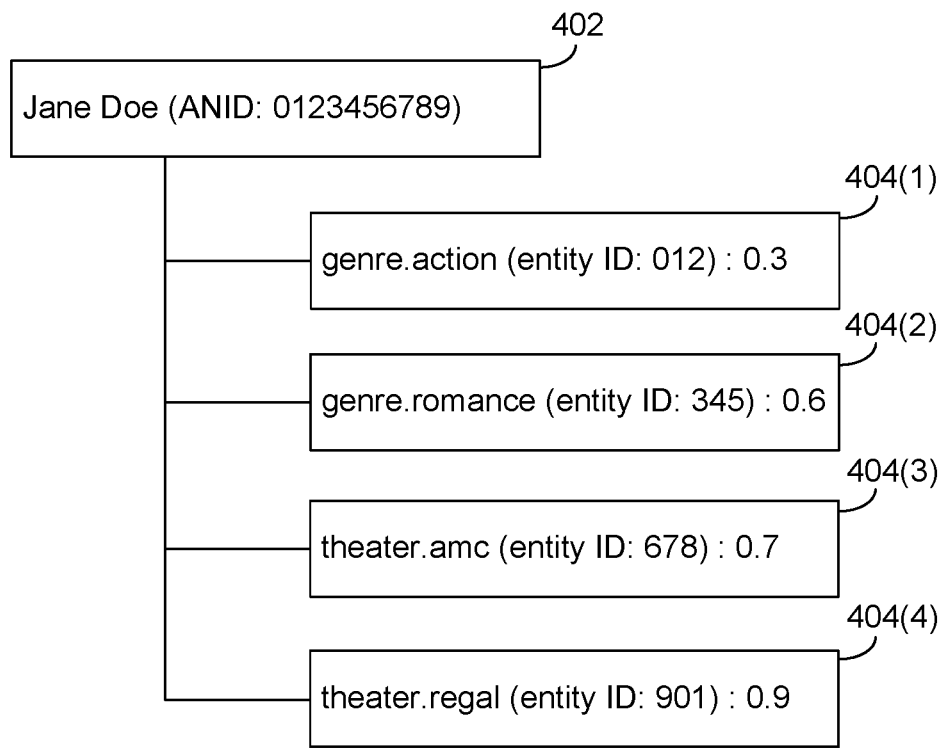
FIG. 4 shows a graphical representation of an example of user preference information, consistent with some implementations of the present concepts.

FIG. 4 shows a graph representing an example of the user preference information 116. The user preference information 116 may be stored in a list structure, a table structure, a graph structure, or any other data structure. The example in FIG. 4 is shown as being stored in a graph structure. The user preference information 116 may contain a user ID 402 associated with the user 102. In this example, the user 102 is Jane Doe and her user ID 402 is an ANID having a value of 0123456789. The user preference information 116 may include one or more tags 404 in association with the user ID 402, and each tag 404 may be associated an entity ID and have a confidence value. In this example, tag 404(1) is for an action genre, indicated by an entity ID of 012, and has a confidence value of 0.3; tag 404(2) is for a romance genre, indicated by an entity ID of 345, and has a confidence value of 0.6; tag 404(3) is for an AMC™ theater, indicated by an entity ID of 678, and has a confidence value of 0.7; and tag 404(4) is for a Regal™ theater, indicated by an entity ID of 901, and has a confidence value of 0.9. As discussed above, the entity IDs in the user preference information 116 may match the entity IDs in the segment information.

Although the example illustrated in FIG. 4 includes names (i.e., the name of the user 102 and the names of the tags 404 or matching entities), these names may be excluded from the user preference information 116, because the user ID 402 and the entity IDs may be sufficient identifications. Furthermore, although the simplified example of the user preference information 116 in FIG. 4 includes only four tags 404 for illustration purposes, the user preference information 116, according to the present concepts, may contain voluminous number of tags 404. Likewise, although the example in FIG. 4 includes only one level or tier of tags 404 that are directly connected to the user ID 402, the tags 404 in the user preference information 116, according to the present concepts, may be organized into multiple levels or tiers having a hierarchical structure.

The example user preference information 116 depicted in FIG. 4 may be associated with a showtimes segment. Although not illustrated, the user preference information 116 that is associated with, for example, a shoe retail shopping segment may include tags indicating the user's preferences regarding topics and entities relating to shoes, such as certain brands of shoes, merchant sellers of shoes, shoe sizes, types of shoes, price points, endorsements by celebrity athletes, etc. In some implementations, the user preference information 116 may be associated with one particular segment and thus include tags relating to only one segment. In other implementations, the user preference information 116 may contain tags relating to multiple segments.

In accordance with some implementations of the present concepts, the user preference information 116 may be updated. User preferences and interests can change over time. For example, the user 102 may prefer shopping for boots (a type of shoes) in the winter and prefer shopping for sandals (a different type of shoes) in the summer. The user 102 may have preferred only horror movies at one point but, after having kids, now also prefers family movies as well. The user 102 may have preferred United Airlines™ at one point in time, but after a bad experience, began boycotting them altogether. Accordingly, the activity history 114 may be updated to include recent activities of the user 102 as the user submits additional search queries, clicks on additional search results, and/or browses additional web pages.

In some implementations, the activity history 114 may include all past activities recorded for the user 102 regardless of when those activities occurred. Alternatively, a rolling window approach may be used to remove old activities of the user 102 from the activity history 114, such that the activity history 114 may be time-limited. For example, the activity history 114 may only include activities of the user 102 from, for example, the past month, the past 6 months, the past 12 months, the past 5 years, etc. Different segments may use different time period windows to limit the activity history 114.

The process of generating tags 404 and/or calculating or updating confidence values by the tag generator 308, described above in reference to FIGS. 3 and 4, may be performed in real time as the activity history 114 is updated with new activities by the user 102. Alternatively, the process may be scheduled to be performed periodically (for example, daily, weekly, monthly, quarterly, yearly, etc.) with respect to the newly added activities that have been recorded in the activity history 114 since the last run. Furthermore, regardless of whether the activity history 114 contains updates, if the segment information has been updated, the tag generator 308 may reference the updated segment information to possibly update the user preference information 116.

Figure 5:
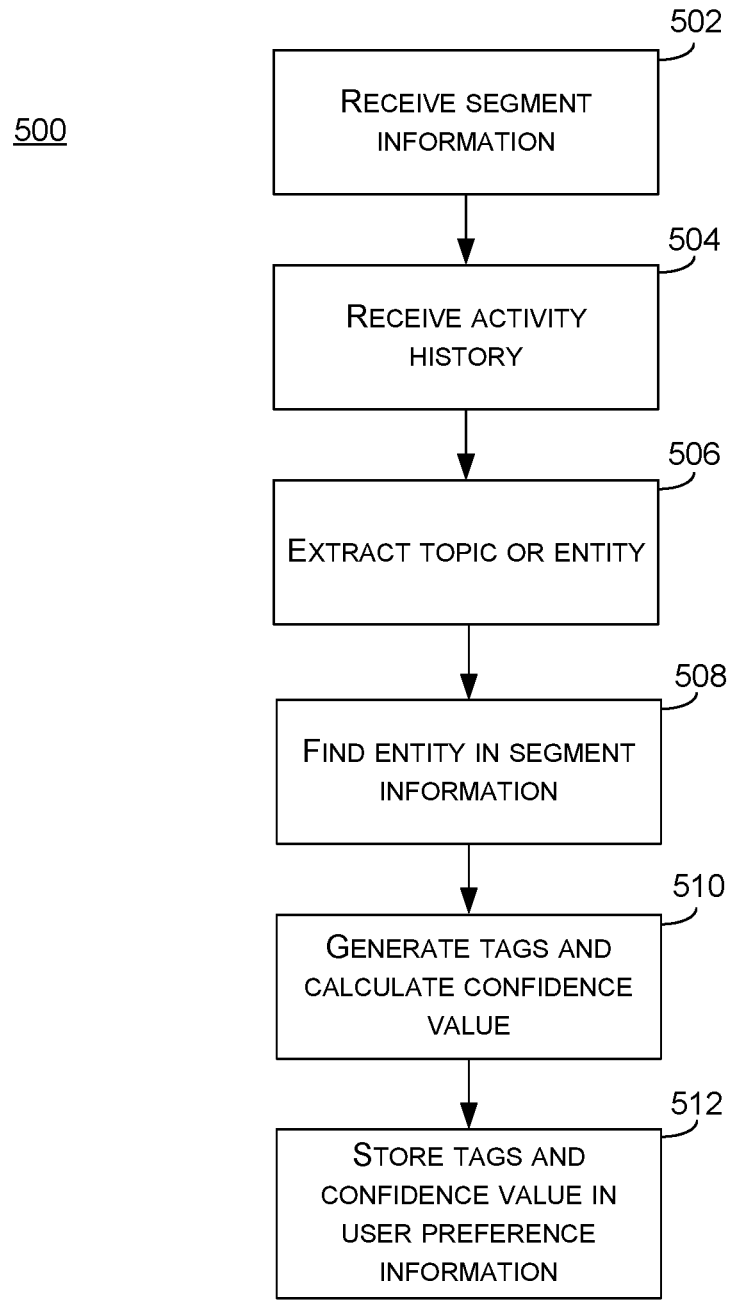
FIG. 5 shows a flowchart illustrating a preference inferring method for inferring user preference information, consistent with some implementations of the present concepts.

FIG. 5 shows a flowchart illustrating a preference inferring method 500 for inferring user preference information. In some implementations, the acts in the preference inferring method 500 may be performed during the pre-search processing stage.

In act 502, segment information associated with a segment may be received. The segment information may be received from a segment data provider and/or a segment data crawler. The segment information may include information about entities that relate to the segment.

In act 504, activity history associated with a user may be received. In some implementations, the activity history may include one or more of a query history, a click history, or a browse history. The activity history may be received from a web browser and/or a personalized search engine.

In act 506, one or more topics or entities may be extracted from the activity history of the user. For example, the text of a search query from the click history or the contents of a web page associated with the click history and/or the browse history may be parsed and analyzed to identify one or more of topics or entities to which the activity history relates.

In act 508, one or more entities in the segment information may be found that match or relate to the one or more topics or entities extracted in act 506. For example, if entities "Jack Reacher" and "Tom Cruise" are extracted from a web page about the movie and the actor in act 506, then the segment information may be searched in act 508 to find the entities for Jack Reacher and Tom Cruise stored in the segment information. If the activity history relates to the segment, the search may result in a hit, but if the activity history is unrelated to the segment, the search may result in no hits and the subsequent acts in this method may not be performed for the activity history.

In act 510, one or more tags may be generated and corresponding confidence values may be calculated. The information about the entities found in the segment information in act 508 can be used to generate the tags and calculate the confidence values.

In act 512, the tags and the confidence values may be stored in the user preference information associated with the user. Accordingly, consistent with the present concepts, the user preference information can accurately reflect the user's preferences and interests which were inferred from the user's activity history. The accuracy and comprehensiveness of the user preference information may increase as more activity history of the user is tracked and analyzed.

Search-Time Processing

Figure 6:
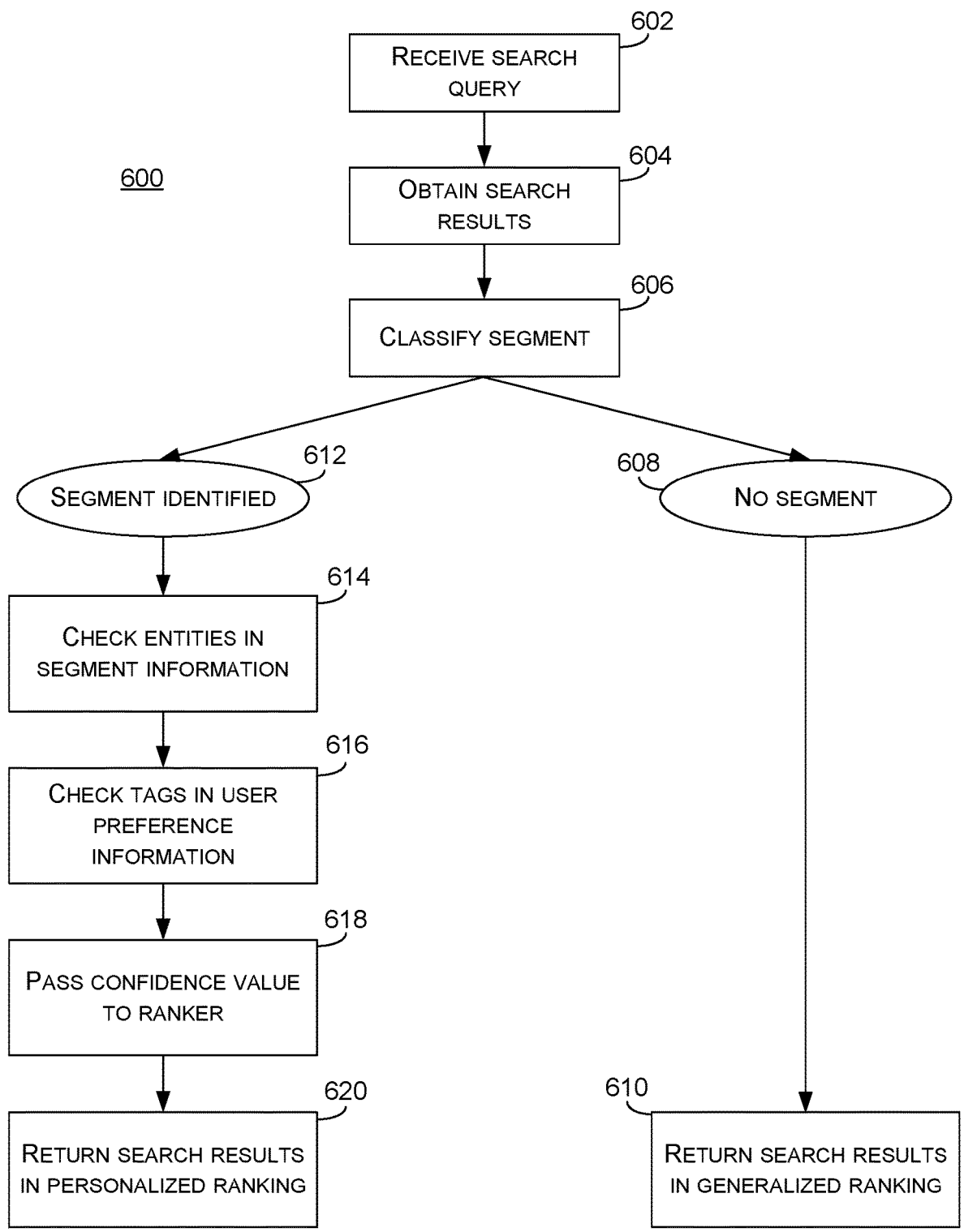
FIG. 6 shows a flowchart illustrating a personalization method for providing personalized rankings of search results, consistent with some implementations of the present concepts.

FIG. 6 shows a flowchart illustrating a personalization method 600 for providing personalized rankings of search results. The acts in the personalization method 600 may be performed during the search-time processing stage, whereas the processes in connection with generating the segment information and the user preference information have been described above as being performed during the pre-search processing stage. However, any of the acts described above as being performed during the pre-search processing stage may be performed during the search-time processing stage.

In act 602, a search query may be received from a user. For example, the user may enter the search query to a web browser, and a search provider may receive the search query from the web browser. In act 604, search results corresponding to the search query may be obtained. For example, the search provider may perform a search using a personalized search engine based on the search query to obtain the search results.

In act 606, the search query may be classified into a target segment. For example, if the search query is "flights from seattle" or "cheap flights during thanksgiving weekend," then the target segment may be identified as the flights segment. As another example, if the search query is "discount women's shoes" or "black friday shoe sales," then the search query may be classified as being directed to the shoes retail shopping segment.

In some implementations, the target segment may be identified based on the search query. For example, a whitelist of 10 million queries that trigger a particular segment may be stored and referenced when a search query is received. If the search query is found in the whitelist, then the search query can be classified into the segment associated with the whitelist. If the search query is not found in the whitelist, additional analysis can be performed. For instance, grammar-based rules (such as "flight from"+[geographical location]) may be used to classify search queries into the target segments.

In other implementations, the search results obtained from the personalized search engine in act 604 may be analyzed to determine the target segment. For example, all the search results or just the top search results (e.g., the top ten search results according to a generic, non-personalized rankings) may be evaluated to determine, for example, that they relate to the movie showtimes segment or the sports segment, etc. In one implementation, both the search query and the search results may be analyzed to determine the target segment. Where the search results are not used to identify the target segment, act 606 may be performed before act 604. Furthermore, if a search query that was not found in the whitelist for a segment but has been classified into the segment based on an analysis of the search query and/or the search results, then the search query may be added to the whitelist so as to avoid the analysis for future submissions of the same search query.

In act 608, it may be determined that the search query is not directed to any segment for which the present concepts of providing personalized rankings have been implemented. In such a scenario, in act 610, the search results may be returned to the user in the generalized rankings that are not personalized for the user. The generalized rankings, for example, may be the default rankings provided by the personalized search engine that does not take into account the user's preferences.

Alternatively, in act 612, the target segment, for which the present concepts have been implemented, and to which the search query is directed may be identified. In response, the segment information associated with the identified segment may be retrieved. In act 614, the entities in the segment information may be checked. That is, the search results may be checked against the entities stored in the segment information. Where the search results obtained from the personalized search engine include corresponding entity IDs, act 614 may be a simple process of looking up the entity IDs in the segment information. Where entity IDs are not included with the search results, techniques described above in reference to FIG. 3 for extracting topics from web pages may be utilized here to identify topics relating to the search results and then searching for entities in the segment information that correspond to the identified topics.

Furthermore, the user preference information associated with the identified segment may be retrieved. In act 616, tags in the user preference information are checked. In response to identifying certain entities, if any, in the segment information that relate to the search results in act 614, the entity IDs associated with those entities may be matched with the entity IDs stored along with tags in the user preference information.

If no matching tag is found in the user preference information, then the user does not have a preference for the particular entity. And thus, the search results associated with the entity may not be modified in view of the user's preference. But if a matching tag is found, then the corresponding confidence value indicates the strength of the user's preference for the corresponding entity, which relates to the particular search result. Thus, consistent with the present concepts, the particular search result may be ranked higher in view of the user's interests in it.

In an alternative implementation, the acts 614 and 616 may be implemented differently and achieve the same result of determining which search result has an associated confidence value in the user preference information. After the target segment is identified in act 612, the corresponding segment information and the corresponding user preference information may be retrieved. Then, a join operation may be performed with the segment information and the user preference information to identify topics or entities, if any, for which the user has a preference. The confidence values stored for the tags associated with those topics or entities can be obtained from the user preference information. Then, the search results are analyzed to determine which search results relate to the topics or entities for which the user has a preference.

In act 618, the confidence value associated with the tag may be passed to a personalized ranker along with an identification of the particular search result. The personalized ranker may be a segment-specific ranker associated with the target segment. The personalized ranker therefore may receive confidence values of tags, which are associated with certain search results, as a signal or a feature (among many features, such as the popularity of a web page, the number of past clicks, etc.) of those search results. The personalized ranker can consider the confidence values associated with those search results to generate personalized rankings of the search results. For instance, in a movies segment, signals associated with, for example, genre, language, etc., may be used by the personalized ranker to rank search results corresponding to movie entities. Accordingly, the confidence values associated with certain tags may be signals passed to the personalized ranker for consideration in ranking search results. Specifically, certain search results relating to topics or entities that the user prefers (or has interests in) may be ranked higher compared to the non-personalized default rankings. The strength of the user preference signal (indicated by the confidence value) may determine the degree to which the ranking of a certain search result is adjusted. Additionally, in implementations where the user's dislikes are tracked, certain search results relating to topics or entities that the user dislikes may be ranked lower. In some implementations, the personalized ranker may use machine-learning models to generate the personalized rankings of the search results by taking into account the confidence values from the user preference information.

In act 620, the search results, which have been ordered according to the personalized rankings calculated in view of the user's preferences, may be returned to the user.

Figure 7:
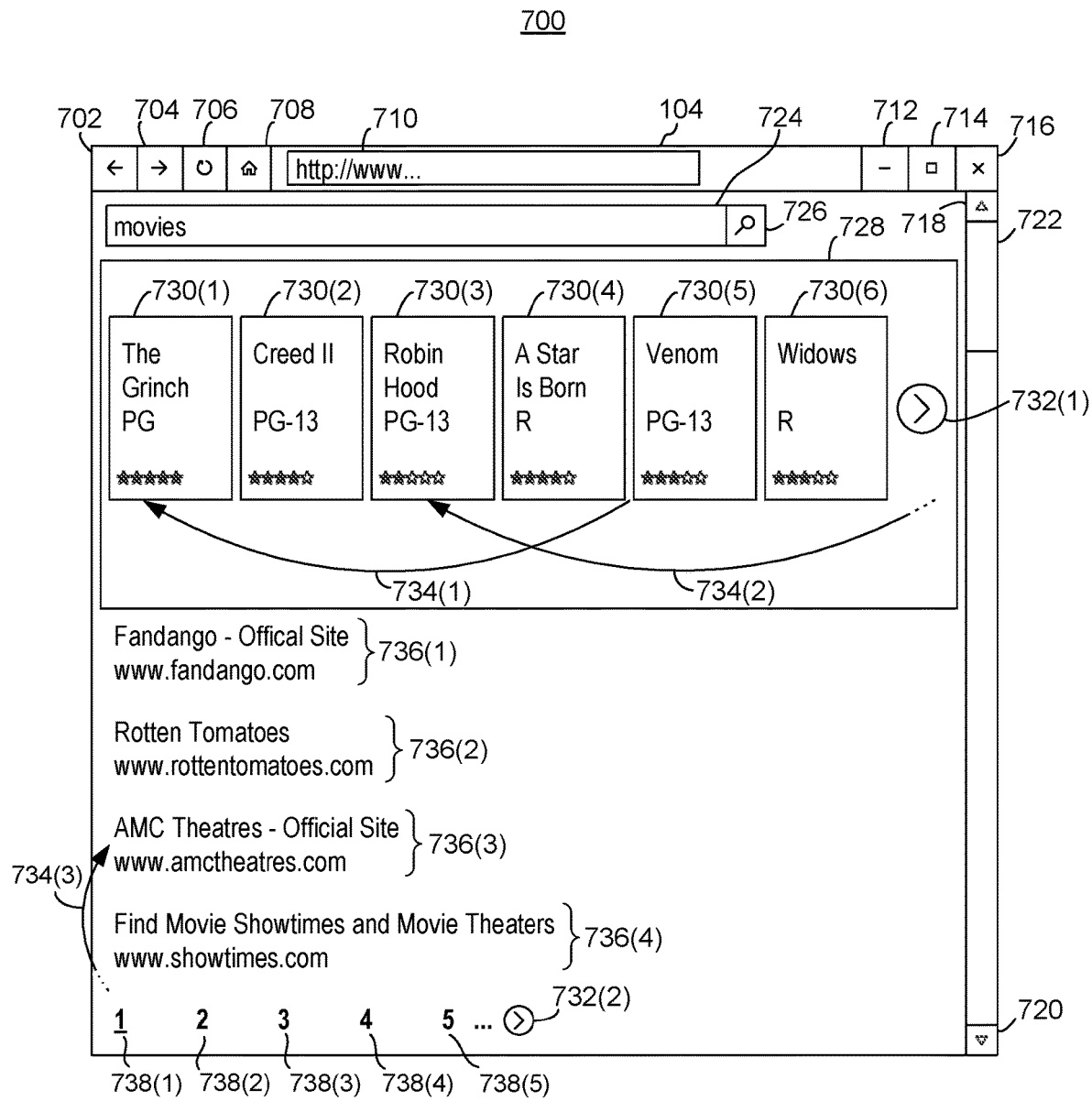
FIG. 7 illustrates a user interface displaying examples of personalized rankings of search results, consistent with some implementations of the present concepts.

FIG. 7 illustrates a user interface 700 displaying examples of personalized rankings of search results 110. In this example, the user interface 700 is that of the web browser 104. The web browser 104 may include several user interface ("UI") elements, such as a back navigation button 702, a forward navigation button 704, a refresh button 706, a home button 708, a URL address bar 710, a minimize button 712, a maximize button 714, a close button 716, a scroll up button 718, a scroll down button 720, and a scroll bar 722. The web browser 104 may also include a text box 724 for inputting the search query 106 and for displaying the search query 106. In this example, the search query 106 displayed in the text box 724 is "movies." The web browser 104 may further include a search button 726, which the user 102 may activate to begin a search using the search query 106 entered in the text box 724.

Consistent with the present concepts, the web browser 104 may display search results 110 that are returned in response to the search query 106. The search results 110 may be ordered in accordance with their rankings. In some implementations, the web browser 104 may display an entity pane 728 (or an entity box), which may be similar to what is commonly referred to as a rich answer box. The entity pane 728 may be used to display a certain set of entity search results 730 corresponding to a certain type of entity (e.g., the movie entity in this example) in the target segment. If there are too many entity search results 730 to display on the screen, additional pages of entity search results 730 may be accessed by the user 102 by activating a next page button 732(1). Using this button 732(1) may also reveal a previous page button (not shown).

In accordance with the present concepts, one or more entity search results 730(1) and 730(3) that are preferred by the user 102 may have been given priority rankings, as indicated by arrows 734. The arrows 734 are not displayed to the user 102 in the web browser 104; rather, they are drawn in FIG. 7 for illustration purposes to indicate that the rankings of the search results 730 have been customized in view of the user's preferences. In the example shown in FIG. 7, the entity search results 730(1) and 730(3) corresponding to the movies The Grinch and Robin Hood, respectively, may have been ranked higher in response to the user preference information 116 indicating that the user 102 prefers movies in the family genre. In some implementations, certain entity search results 730(1) and 730(3), whose rankings have been adjusted in view of the user preference information 116, may be marked (e.g., highlighted or bordered) to indicate that personalized rankings have been applied to those search results 730(1) and 730(3).

The degree of ranking adjustment (indicated by the arrows 734) may depend on several factors including, for example, (1) the confidence scores, discussed above as being calculated by the topic extractor 312, that indicate how likely the search results 730 are of the family genre, and (2) the confidence values, discussed above as being calculated by the tag generator 308 and being stored in the user preference information 116, that indicate how much the user 102 prefers the family genre.

For example, as illustrated in FIG. 7, the entity search result 730(1) that corresponds to The Grinch moved up three spots compared to where it would have been ranked according to the non-personalized rankings. And, the entity search result 730(3) that corresponds to Robin Hood moved up enough spots to bring it into the first page of entity search results 730 in the entity pane 728, whereas it would have required the user 102 to use the next page button 732(1) one or more times to find this entity search result 730(3) in the non-personalized rankings.

Furthermore, the web browser 104 may display generic (i.e., non-entity) search results 736. These search results 736 are commonly referred to as "blue links." Similar to the entity search results 730, there may be too many generic search results 736 to display them all on the screen. Therefore, the user 102 may use one or more of the scroll up button 718, the scroll down button 720, the scroll bar 722, a next page button 732(2), and page links 738 to reveal additional generic search results 736.

In this example, an arrow 734(3) indicates that the generic search result 736(3) that corresponds to AMC Theatres™ was ranked higher due to the user 102 having a preference for AMC Theaters™ (which may have been indicated by a tag 404 in the user preference information 116) than it would have been ranked in the non-personalized rankings. Accordingly, for the user 102 who may have a strong preference for AMC Theaters™ (for example, because the user 102 has enrolled in their rewards program or prefers their screens, seats, or food), the search results 736 presented to the user 102 may show AMC Theaters™ first even if there are other theater chains that are physically located closer to the user's location. Certain search results 736(3) whose rankings have been modified according to the user's preferences may be indicated (colored, highlighted, marked, bolded, etc.) to the user 102.

In some implementations where dislikes are recorded in the activity history 114 and negative confidence values are stored in the user preference information 116, certain search results 110 relating to topics or entities that the user 102 dislikes may be adjusted to have lower rankings so that they appear later (e.g., further down the list or in later pages). Such negative adjustments may be made in a similar manner as the positive adjustments described above.

In some implementations, the personalized search engine 108 may return the same set of search results 730 and 736 to multiple users but modify only the rankings (i.e., the ordering) of those search results 730 and 736 for individual users based on their own personal preferences. In other implementations, the sets of search results 730 and 736 returned to different users may be different.

Compared to the non-personalized rankings returned by conventional search engines, the personalized rankings of the search results 730 and 736, returned by the personalized search engine 108, have the benefits of placing certain search results 730(1), 730(3), and 736(3) that are more interesting to the user 102 based on her personal preferences at the beginning, front, or top of the web browser 104. Because the user preference information 116 were accurately inferred based on the user's past activity history 114, the user 102 will perceive the personalized rankings as being more relevant and accurate. Moreover, the user 102 is more likely to find relevant search results 730(1), 730(3), and 736(3) quickly and enjoy a more pleasant and efficient searching experience. Using the improved personalized search engine 108 of the present concepts, the user 102 is less likely to experience the common problems associated with conventional search engines (and their generic rankers) that do not consider individual user preferences when ranking search results 730 and 736. These problems include difficulty in finding relevant search results 730(1), 730(3), and 736(3) that are often buried among irrelevant search results, and time wasted scrolling to the bottom of the list of search results 730 and 736, or paging through many pages of irrelevant search results before finding the relevant search result 730(1), 730(3), and 736(3). These problems often frustrate the user and make searching a very unpleasant experience. Moreover, some users may not even put in the effort or have the patience to scroll or page through irrelevant search results. They may simply try different search queries if they don't see relevant search results at the very top, which further wastes time and computing resources.

Example System

Figure 8:
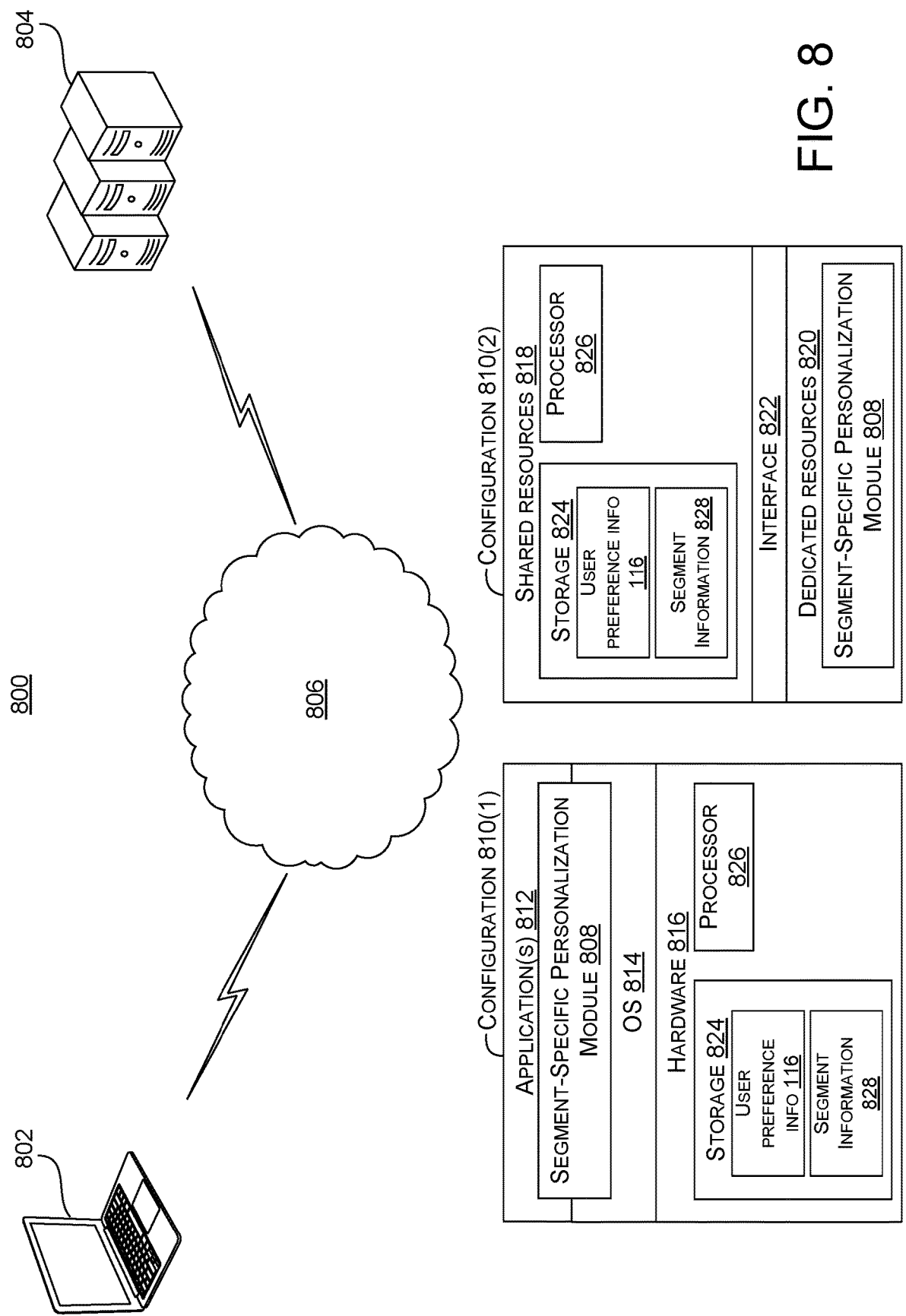
FIG. 8 illustrates an example system in which some implementations of the present concepts can be employed.

FIG. 8 illustrates an example system 800 in which some implementations of the present concepts can be employed. For purposes of explanation, the system 800 may include one or more client devices 802 and one or more server devices 804. The number of devices and the type of devices described and depicted are intended to be illustrative and non-limiting. Examples of the devices 802 or 804 can include traditional computing devices, such as personal computers, desktop computers, servers, notebook computers, cell phones, smart phones, personal digital assistants, pad type computers, mobile computers, wearable devices, cameras, appliances, kiosks, smart devices, IoT devices, vehicles, etc., and/or any of a myriad of ever-evolving or yet to be developed types of computing devices. In the illustrated example, the client devices 802 may include a laptop computer.

The devices 802 and 804 may be controlled via one or more input controls, such as a keyboard, mouse, touchscreen, or voice command. The client devices 802 and the server devices 804 can communicate with one another via one or more networks 806. The network 806 may include an intranet and/or the Internet, and can be wired or wireless.

In some implementations, each of the client devices 802 or the server devices 804 may perform the processes of the present concepts described above (including the preference inferring method and the personalization method 600) as a standalone device. Alternatively, in other implementations, the performance of any or all of the acts of the present concepts described above may be divided among the client devices 802 and the server device 804 consistent with a client-server model.

In one implementation, the client device 802 may include software applications, such as the web browser 104 described above. The user 102 may interact with the web browser 104 on the client devices 802 to perform searches, browse web pages, and receive the personalized rankings of search results consistent with the present concepts.

The server devices 804 may be operated by a search provider. The server devices 804 may include, for example, a segment-specific personalization module 808, which may be software, hardware, or a combination of both, that implements all or part of the present concepts described above. For example, the segment-specific personalization module 808 may include one or more of the personalized search engine 108, the personalized ranker 112, the tag generator 308, and the data filter 314. The segment-specific personalization module 808 may perform one or more of the acts described in the preference inferring method 500 and/or the personalization method 600. The server device 804 may include one or more databases 118 for storing the segment information 828 and/or the user preference information 116. One or both of the client devices 802 and the server devices 804 may record and/or store the activity history 114 of the user 102.

The term "device," "computer," or "computing device" as used herein can mean any type of device that has some amount of processing capability and/or storage capability. Processing capability can be provided by one or more hardware processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include transitory propagating signals. In contrast, the term "computer-readable storage media" excludes transitory propagating signals. Computer-readable storage media include "computer-readable storage devices." Examples of computer-readable storage devices include volatile storage media, such as RAM, and non-volatile storage media, such as hard drives, optical discs, and flash memory, among others.

FIG. 8 shows two example device configurations 810(1) and 810(2) that can be employed by any or all of the client devices 802 and/or the server devices 804. The client devices 802 and the server devices 804 can employ either of the configurations 810(1) or 810(2), or an alternate configuration. One instance of each configuration 810 is illustrated in FIG. 8. The device configuration 810(1) may represent an operating system (OS) centric configuration. The device configuration 810(2) may represent a system-on-chip (SOC) configuration. The device configuration 810(1) can be organized into one or more applications 812, operating system 814, and hardware 816. The device configuration 810(2) may be organized into shared resources 818, dedicated resources 820, and an interface 822 therebetween.

In either configuration 810, the device 802 or 804 can include storage/memory 824 and a processor 826. The storage 824 may include the user preference information 116 and/or segment information 828, which may be stored in one or more databases 118 in the storage 824. The device 802 or 804 may also include other components that are not illustrated in FIG. 8, such as a battery (or other power source), a network communication component, and/or input-output components. As mentioned above, the device 802 or 804 can also include the segment-specific personalization module 808.

In the case of the device configuration 810(2), certain functionality provided by the device 802 or 804 can be integrated on a single SOC or multiple coupled SOCs. One or more processors 826 can be configured to coordinate with shared resources 818, such as storage/memory 824, etc., and/or one or more dedicated resources 820, such as hardware blocks configured to perform certain specific functionality. The term "processor" as used herein can also refer to hardware processors, such as central processing units (CPUs), graphical processing units (GPUs), controllers, microcontrollers, processor cores, field programmable gate arrays (FPGAs), or other types of processing devices.

CONCLUSION

The concepts described herein can be extended and applied to any field where the user preference information

116 can be used to provide more personalized data or experience to the user 102. For example, search query suggestions provided by a search provider to the user 102 may take advantage of the user preference information 116 to recommend certain search query suggestions that are more targeted to the specific user's preferences and interests. As another example, the user preference information 116 may be used to provide proactive notifications or feeds to the user 102 that the user 102 is very likely to be interested in. For instance, if the user preference information 116 indicates that the user 102 has a very strong preference for movies starring Tom Cruise, notifications (e.g., feeds, alerts, or advertisements) about a new, upcoming movie starring Tom Cruise may be sent to the user 102 even if the user 102 never requested to follow such a new movie. Moreover, the user preference information 116 may be analyzed to suggest top picks for movies, podcasts, TV shows, etc., that the user 102 is more likely to be interested in.

Various device examples are described above. Additional examples are described below. One example includes a system comprising one or more databases storing segment information associated with a segment, the segment information including information about entities relating to the segment, and user preference information associated with a user, the user preference information including tags that correspond to the entities in the segment information, the tags having confidence values as measurements of the user's preferences with respect to the corresponding entities. The system further comprises one or more hardware processors and at least one computer-readable storage medium storing computer-readable instructions which, when executed by the one or more hardware processors, cause the one or more hardware processors to receive activity history of the user, generate the user preference information based at least on the activity history and the segment information, receive a search query from the user, generate search results responsive to the search query, determine that the search query is directed to the segment based at least on the search query or the search results, inferring a user preference for a particular search result by determining that the particular search result relates to a particular entity in the segment information for which a corresponding tag exists in the user preference information, rank the search results by promoting a ranking of the particular search result based at least on a particular confidence value associated with the corresponding tag to generate personalized rankings of the search results reflecting the promoted ranking of the particular search result, and provide the personalized rankings of the search results to the user.

Another example can include any of the above and/or below examples where the segment relates to one of: showtimes, retail shopping, sports, or flights.

Another example can include any of the above and/or below examples where the information about the entities are stored in one or more entity graphs.

Another example can include any of the above and/or below examples where the entities in the segment information have entity identifiers and the corresponding tags in the user preference information have matching entity identifiers.

Another example can include any of the above and/or below examples where the activity history comprises at least one of: a query history, a click history, or a browse history.

Another example can include any of the above and/or below examples where the click history comprises satisfactory clicks and excludes dissatisfactory clicks and the satisfactory clicks are distinguished from the dissatisfactory clicks based at least on dwell times.

Another example can include any of the above and/or below examples where the activity history falls within a specified time period.

Another example can include any of the above and/or below examples where the user preference information is stored in a user graph.

Another example can include any of the above and/or below examples where a degree to which the ranking of the particular search result is promoted is based at least on the particular confidence value.

Another example includes a method comprising receiving segment information containing information about entities related to a segment, receiving activity history of a user, generating tags and associated confidence values based at least on the activity history and the segment information, the tags corresponding to the entities in the segment information, storing the tags and the associated confidence values in user preference information, receiving a search query from the user, obtaining search results based at least on the search query, determining that the search query is directed to the segment based at least on the search query or the search results, inferring a user preference for a particular search result by determining that the particular search result relates to a particular entity in the segment information for which there is a corresponding tag in the user preference information, promoting a ranking of the particular search result based at least on a particular confidence value associated with the corresponding tag to generate personalized rankings of the search results, and sending the personalized rankings of the search results to the user.

Another example can include any of the above and/or below examples where generating the tags and the associated confidence values comprises determining that the activity history relates to the entities in the segment information.

Another example can include any of the above and/or below examples where receiving the activity history comprises receiving at least one of a query history, a click history, or a browse history.

Another example can include any of the above and/or below examples where generating the tags and the associated confidence values comprises analyzing a web page associated with the click history or the browse history to determine that the web page relates to one or more of the entities in the segment information, where the tags correspond to the one or more of the entities.

Another example can include any of the above and/or below examples where generating the confidence values comprises using a machine-learning model to calculate the confidence values as a measure of the user's preferences for the associated tags that correspond to the entities in the segment information.

Another example can include any of the above and/or below examples where the above method further comprises receiving updated activity history of the user and updating the user preference information based at least on the updated activity history.

Another example can include any of the above and/or below examples where determining that the particular search result relates to the particular entity comprises parsing and analyzing contents of a web page associated with the particular search result.

Another example can include any of the above and/or below examples where promoting the ranking of the particular search result comprises using a machine-learning model to increase the ranking of the particular search result where an amount of the increase is based at least on the particular confidence value.

Another example includes a computer-readable storage medium comprising instructions which, when executed by one or more hardware processors, cause the one or more hardware processors to perform a process, comprising storing segment information associated with a segment, the segment information including information about entities relating to the segment, the entities having entity identifiers, receiving activity history of a user, generating user preference information associated with the user based at least on the activity history and the segment information, the user preference information including tags having entity identifiers that match the entity identifiers in the segment information, the tags being associated with confidence values that measure the degrees to which the user prefers the corresponding entities in the segment information, receiving a search query from the user, obtaining search results responsive to the search query, classifying the search query as being directed to the segment based at least on the search query or the search results, analyzing a web page associated with a particular search result to identify a particular entity in the segment information that relates to the particular search result, finding a particular tag in the user preference that corresponds to the particular entity based at least on a particular entity identifier associated with the particular entity, increasing a ranking of the particular search result based at least on a particular confidence value associated with the particular tag, generating personalized rankings of the search results based at least on the increased ranking of the particular search result, and sending the personalized rankings of the search results to the user.

Another example can include any of the above and/or below examples where the instructions further cause the one or more hardware processors to classify one or more of the tags as being a controversial subject and exclude the one or more of the tags from the user preference information.

Another example can include any of the above and/or below examples where analyzing the web page comprises extracting one or more topics from the web page and identifying one or more entities in the segment information relating to the one or more topics.

Although the subject matter has been described in language specific to structural features and/or methodological acts, the subject matter defined in the appended claims is not necessarily limited to the specific features or acts described above. Rather, the specific features and acts described above are presented as example forms of implementing the claims, and other features and acts that would be recognized by one skilled in the art are intended to be within the scope of the claims.

The invention claimed is:

1. A system, comprising:
one or more databases storing:
segment information associated with a segment, the segment information including information about entities relating to the segment; and
user preference information associated with a user, the user preference information including tags that correspond to the entities in the segment information, the tags having confidence values as measurements of the user's preferences with respect to the corresponding entities;
one or more hardware processors; and
at least one computer-readable storage medium storing computer-readable instructions which, when executed by the one or more hardware processors, cause the one or more hardware processors to:
receive an activity history of the user;
generate the user preference information based at least on the activity history and the segment information, the confidence values being calculated using a machine-learning model based at least on the activity history and the segment information;
receive a search query from the user;
generate search results responsive to the search query, the search results having a non-personalized ranking that is based at least on global popularities of the search results;
determine that the search query is directed to the segment based at least on the search query or the search results;
calculate confidence scores for the search results based at least on frequencies of terms relating to the corresponding entities, the confidence scores reflecting degrees to which the search results relate to the corresponding entities;
infer a user preference for a particular search result based on a particular confidence score that indicates how much the particular search result relates to a particular entity and based on a particular confidence value that indicates how much the user prefers the particular entity;
modify the non-personalized ranking of the search results by adjusting a ranking of the particular search result based at least on the user preference to generate a personalized ranking of the search results reflecting the adjusted ranking of the particular search result, a degree to which the ranking of the particular search result is adjusted being determined based on the particular confidence score and the particular confidence value; and
provide the personalized ranking of the search results to the user.

2. The system of claim 1, wherein the activity history comprises at least one of: a query history, a click history, or a browse history.

3. The system of claim 2, wherein:
the click history comprises satisfactory clicks and excludes dissatisfactory clicks; and
the satisfactory clicks are distinguished from the dissatisfactory clicks based at least on dwell times.

4. The system of claim 1, wherein the activity history falls within a specified time period.

5. The system of claim 1, wherein the compute r-readable instructions further cause the one or more hardware processors to:
identify a subset of the tags as being a controversial subject; and
exclude the subset of the tags from the user preference information, the degree to which the ranking of the particular search result is adjusted is not based on the controversial subject.

6. The system of claim 1, wherein the compute r-readable instructions further cause the one or more hardware processors to:
generating the particular confidence value for the particular entity that reflects a dislike by the user based at least on search queries using an exclusion operator.

7. The system of claim 1, wherein the computer-readable instructions further cause the one or more hardware processors to:
calculate the particular confidence value for the corresponding tag associated with the particular entity based at least on a number of times the user performs activities relating to the particular entity.

8. A method, comprising:
receiving segment information containing information about entities related to a segment;
receiving an activity history of a user;
generating tags based at least on the activity history and the segment information, the tags corresponding to the entities in the segment information;
calculating confidence values associated with the tags based at least on the activity history and the segment information using a first machine-learning model, the confidence values measuring the user's preferences for the associated tags that correspond to the entities in the segment information;
storing the tags and the associated confidence values in user preference information;
receiving a search query from the user;
obtaining search results based at least on the search query, the search results having a non-personalized ranking that is based at least on global popularities of the search results;
determining that the search query is directed to the segment based at least on the search query or the search results;
calculating confidence scores based at least on frequencies of terms relating to the corresponding entities, the confidence scores reflecting degrees to which the search results relate to the corresponding entities;
inferring a user preference for a particular search result based on a particular confidence score that indicates how much the particular search result relates to a particular entity and based on a particular confidence value that indicates how much the user prefers the particular entity;
modifying the non-personalized ranking of the search results by adjusting a ranking of the particular search result based at least on the user preference to generate a personalized ranking of the search results reflecting the adjusted ranking of the particular search result, a degree to which the ranking of the particular search result is adjusted being determined based on the particular confidence score and the particular confidence value; and
sending the personalized ranking of the search results to the user.

9. The method of claim 8, wherein generating the tags comprises:
determining that the activity history relates to the entities in the segment information.

10. The method of claim 9, wherein generating the tags comprises:
extracting content from a web page that the user has clicked on, the web page being included in the activity history of the user;
finding subject phrases in the content using a part-of-speech tagger; and
identifying a topic from the web page using a natural language processing algorithm on the subject phrases.

11. The method of claim 8, further comprising:
receiving an updated activity history of the user; and
updating the user preference information based at least on the updated activity history.

12. The method of claim 8, wherein determining that the particular search result relates to the particular entity comprises:
parsing and analyzing contents of a web page associated with the particular search result.

13. The method of claim 8, wherein adjusting the ranking of the particular search result comprises:
using a second machine-learning model to increase the ranking of the particular search result.

14. The method of claim 8, further comprising:
calculating the particular confidence value for the corresponding tag associated with the particular entity based at least on a number of times the user performs activities relating to the particular entity, wherein the activities include one or more of search queries, clicks, or browses.

15. The method of claim 8, further comprising:
filtering a subset of the tags as being a controversial subject; and
exclude the subset of the tags from the user preference information, the degree to which the ranking of the particular search result is adjusted is not based on the controversial subject.

16. A computer-readable storage medium comprising instructions which, when executed by one or more hardware processors, cause the one or more hardware processors to perform a process comprising:
storing segment information associated with a segment, the segment information including information about entities relating to the segment, the entities having entity identifiers;
receiving an activity history of a user;
generating user preference information associated with the user based at least on the activity history and the segment information, the user preference information including tags having entity identifiers that match the entity identifiers in the segment information, the tags being associated with confidence values that measure degrees to which the user prefers the corresponding entities in the segment information, the confidence values being calculated using a machine-learning model based at least on the activity history and the segment information;
receiving a search query from the user;
obtaining search results responsive to the search query, the search results having a non-personalized ranking that is based at least on global popularities of the search results;
classifying the search query as being directed to the segment based at least on the search query or the search results;
analyzing a web page associated with a particular search result to identify a particular entity in the segment information that relates to the particular search result;
calculating a particular confidence score based at least on frequencies of terms relating to the particular entity, the particular confidence score reflecting a degree to which the particular search result relates to the particular entity;
finding a particular tag and a particular confidence value in the user preference information that corresponds to the particular entity based at least on a particular entity identifier associated with the particular entity;
modifying the non-personalized ranking of the search results by adjusting a ranking of the particular search result to generate a personalized ranking of the search results reflecting the adjusted ranking of the particular search result, a degree to which the ranking of the particular search result is adjusted being determined based on the particular confidence score and the particular confidence value; and sending the personalized ranking of the search results to the user.

17. The computer-readable storage medium of claim 16, wherein the instructions further cause the one or more hardware processors to:
    classify one or more of the tags as being a controversial subject; and
    exclude the one or more of the tags from the user preference information, the personalized ranking of the search results being unbiased by the controversial subject.

18. The computer-readable storage medium of claim 16, wherein analyzing the web page comprises extracting one or more topics from the web page and identifying one or more entities in the segment information relating to the one or more topics.

19. The computer-readable storage medium of claim 16, wherein the process further comprises:
    generating the particular confidence value for the particular tag associated with the particular entity that reflects a dislike by the user based at least on search queries using an exclusion operator.

20. The computer-readable storage medium of claim 19, wherein the process further comprises:
    decreasing the ranking of the particular search result based at least on the particular confidence value.

* * * * *